United States Patent [19]

Honjo et al.

[11] Patent Number: 5,706,152

[45] Date of Patent: Jan. 6, 1998

[54] THIN FILM MAGNETIC HEAD HAVING IMPROVED INSULATION OF UPPER SIDE LEAD TERMINAL

[75] Inventors: Hiroaki Honjo; Sinsaku Saitoh, both of Tokyo, Japan

[73] Assignee: NEC Corporation, Japan

[21] Appl. No.: 577,194

[22] Filed: Dec. 22, 1995

[30] Foreign Application Priority Data

Dec. 26, 1994 [JP] Japan .................................. 6-321920

[51] Int. Cl.$^6$ ........................................................ G11B 5/17
[52] U.S. Cl. ............................................ 360/123; 360/126
[58] Field of Search ..................................... 360/123, 126

[56] References Cited

U.S. PATENT DOCUMENTS

3,891,995   6/1975   Hanazono et al. .................. 360/123

*Primary Examiner*—Stevan A. Resan
*Attorney, Agent, or Firm*—Hayes, Soloway, Hennessey, Grossman & Hage, P.C.

[57] ABSTRACT

In a thin film magnetic head including a substrate, a plurality of organic insulating layers, and a plurality of winding layers alternating with the organic insulating layers, a lead terminal formed by an extension of an uppermost one of the winding layers is covered by two upper ones of the organic insulating layers. An edge of the uppermost one of the two upper organic insulating layers on the lead terminal is outside of an edge of the other beneath the lead terminal.

4 Claims, 9 Drawing Sheets

THIN FILM MAGNETIC HEAD HAVING IMPROVED INSULATION OF UPPER SIDE LEAD TERMINAL

BACKGROUND OF THE INVENTION

1. Field of the Invention

The present invention relates to a thin film magnetic head having laminated organic insulating layers and winding layers.

2. Description of the Related Art

Generally, a thin film magnetic head includes a substrate, a plurality of organic insulating layers, and a plurality of winding layers alternating with the organic insulating layers. In the manufacture of this type of thin film magnetic head, each of the organic insulating layers is patterned by photolithography and etching processes. After that, the organic insulating layers are hardened by heat-curing. As a result, the organic insulating layers are shrunk, causing cracks in the organic insulating layers. If residual metal remains in the cracks, the winding layers are short-circuited via their lead terminals to a magnetic pole layer. This will be explained later in detail.

In order to improve the insulating configuration of a lower side lead terminal, in one prior art thin film magnetic head, the lower side lead terminal is covered by two organic insulating layers. In this case, an edge of the organic insulating layer above the lower side lead terminal is outside of an edge of the organic insulating layer beneath the lower side lead terminal. As a result, cracks are hardly generated in the organic insulating layer beneath the lower side lead terminal, thus avoiding the above-described short-circuit via the lower side lead terminal (see JP-A-63-66710). This will be also explained later in detail.

In the above-described prior art thin film magnetic head, however, the insulation of an upper side lead terminal is insufficient, so that the above-described short-circuit via the upper side lead terminal may still occur.

SUMMARY OF THE INVENTION

It is an object of the present invention to improve the insulation of an upper side lead terminal in a thin film magnetic head.

According to the present invention, in a thin film magnetic head including a substrate, a plurality of organic insulating layers, and a plurality of winding layers alternating with the organic insulating layers, an upper side lead terminal formed by an extension of an uppermost one of the winding layers is covered by two upper ones of the organic insulating layers. An edge of the uppermost one of the two upper organic insulating layers on the upper side lead terminal is outside of an edge of the other beneath the upper side lead terminal. As a result, even if the uppermost organic insulating layer is shrunk by heat-curing, the organic insulating layer beneath the upper side lead terminal is not subject to cracks.

BRIEF DESCRIPTION OF THE DRAWINGS

The present invention will be more clearly understood from the description as set forth below, as compared with the prior art, with reference to the accompanying drawings, wherein.

DESCRIPTION OF THE PREFERRED EMBODIMENT

Before the description of the preferred embodiment, prior art thin film magnetic heads will be explained with reference to FIGS. 1, 2A, 2B, 2C, 3, 4A, 4B and 4C.

Figure 1:
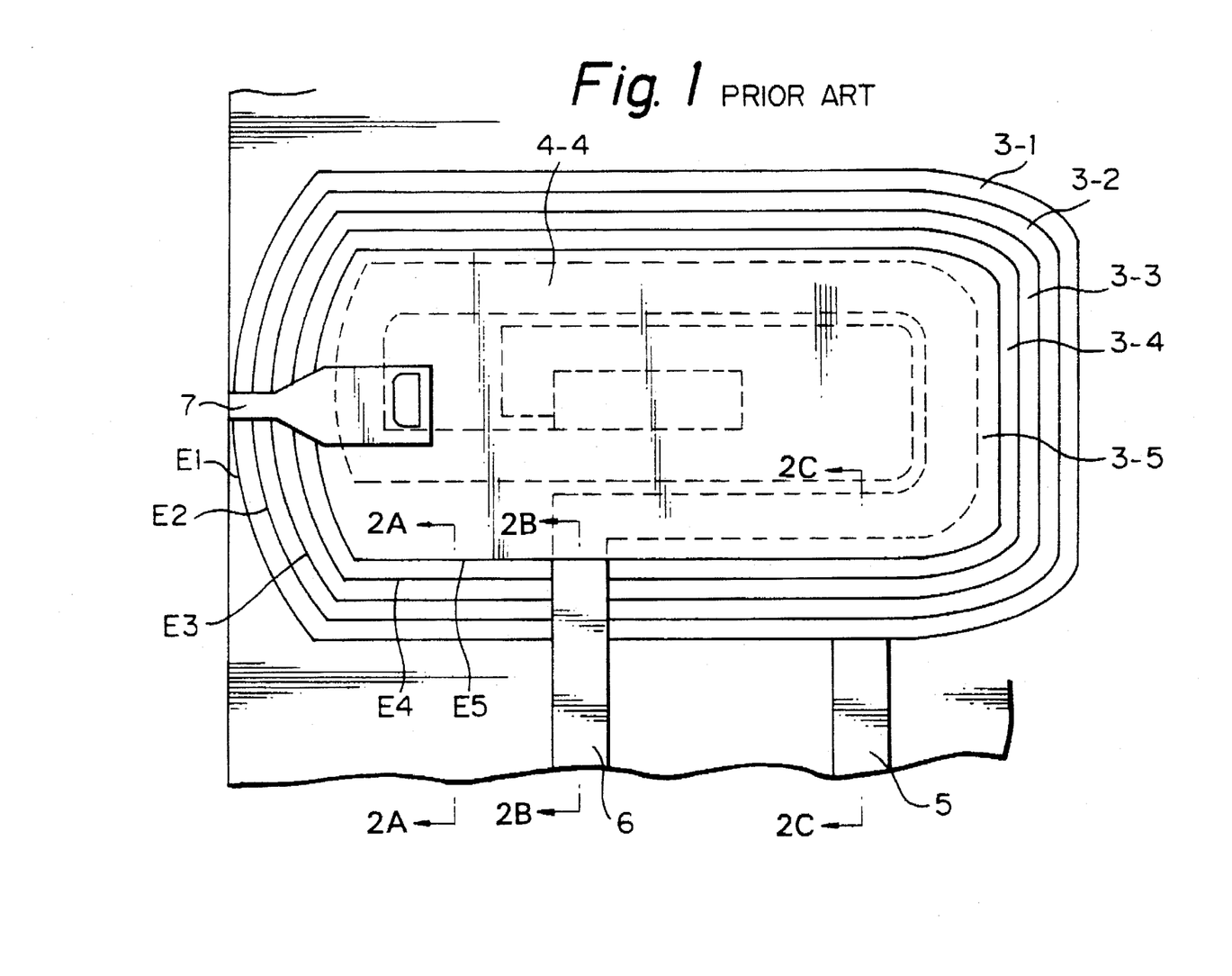
FIG. 1 is a plan view illustrating a prior art thin film magnetic head.
Figure 2A:
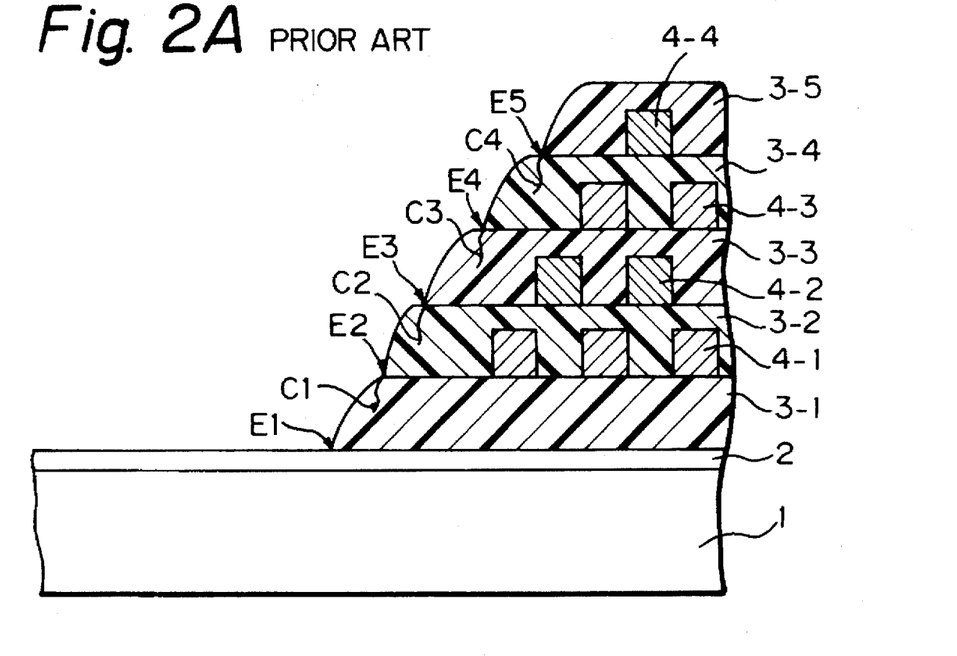
FIGS. 2A, 2B and 2C are cross-sectional views taken along the lines A—A, B—B and C—C, respectively, of FIG. 1.
Figure 2B:
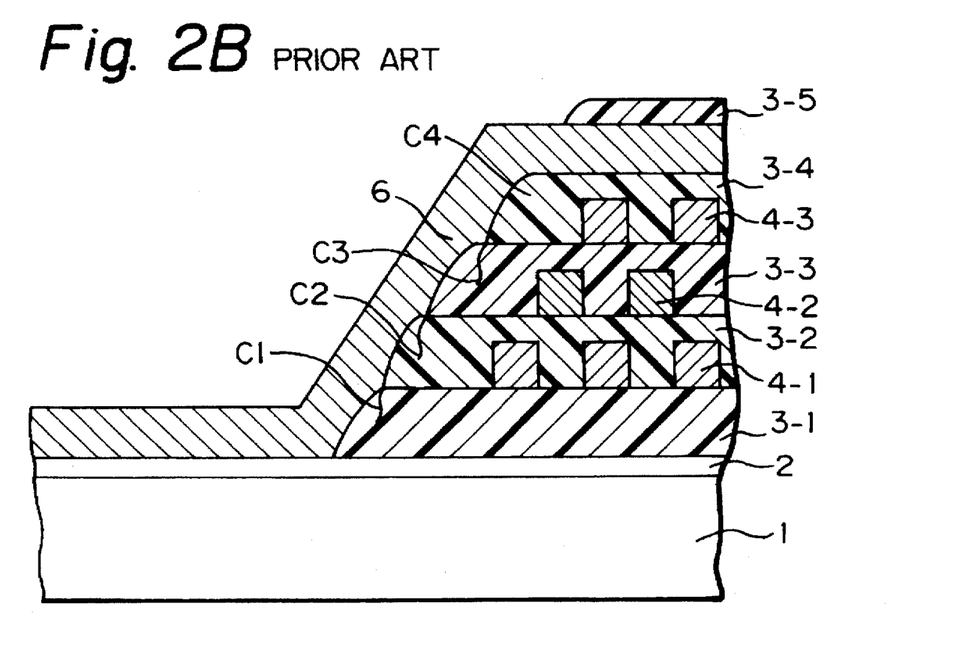
Figure 2C:
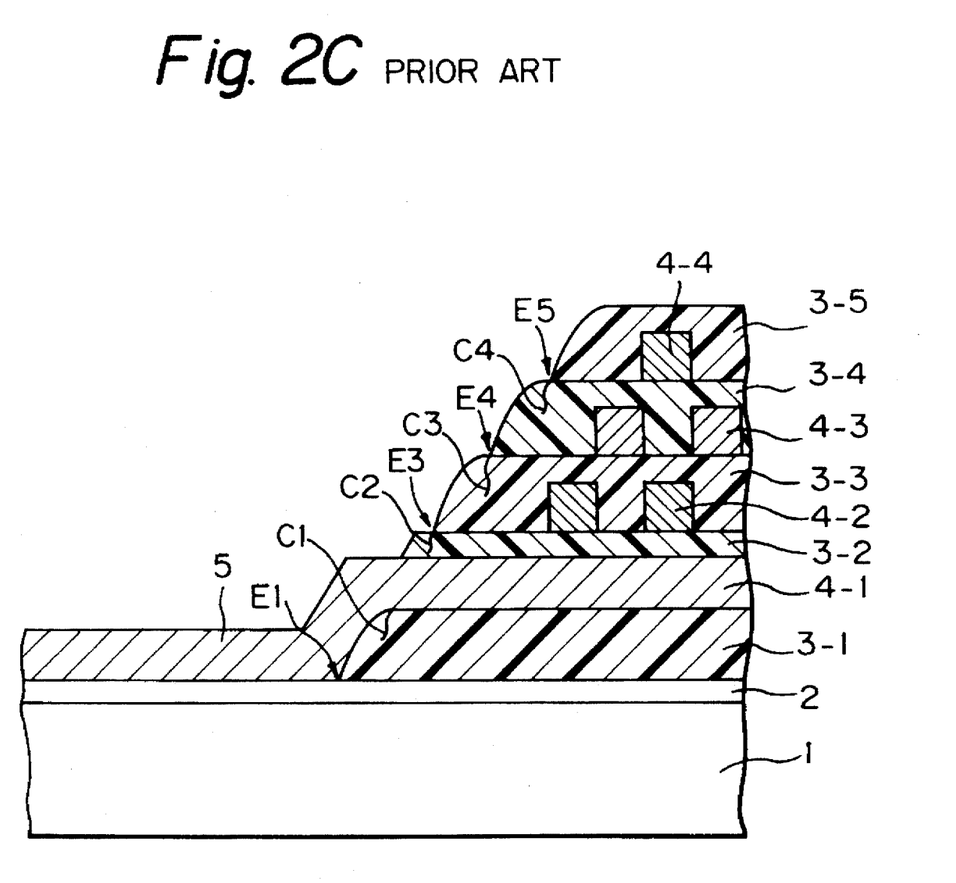

FIG. 1 is a plan view illustrating a prior art thin film magnetic head, and FIGS. 2A, 2B and 2C are cross-sectional views taken along the lines A—A, B—B and C—C, respectively, of FIG. 1. In FIGS. 1, 2A, 2B and 2C, reference numeral 1 designates a substrate on which a lower magnetic pole layer (not shown) is formed. Also, a gap material layer 2 is formed on the substrate 1.

Five organic insulating layers 3-1 to 3-5 are formed, and four winding layers 4-1 to 4-4 are formed alternately with the organic insulating layers 3-1 to 3-5. For example, the winding layer 4-1 is formed on the organic insulating layer 3-1. Also, the winding layers 4-1 to 4-4 are electrically connected by through holes (not shown) provided in the organic insulating layers 3-2, 3-3 and 3-4.

A lower side lead terminal 5 is formed by an extension of the winding layer 4-1, and an upper side lead terminal 6 is formed by an extension of the winding layer 4-4.

Also, reference numeral 7 designates an upper magnetic pole layer.

Each of the organic insulating layers 3-1 to 3-5 is patterned, so that the areas of the organic insulating layers 3-1 to 3-5 are gradually decreased. That is, an edge E1 of the organic insulating layer 3-1 is outside of an edge E2 of the organic insulating layer 3-2. The edge E2 of the organic insulating layer 3-2 is outside of an edge E3 of the organic insulating layer 3-3. The edge E3 of the organic insulating layer 3-3 is outside of an edge E4 of the organic insulating layer 3-4. The edge E4 of the organic insulating layer 3-4 is outside of an edge E5 of the organic insulating layer 3-5. As a result, after heat-curing for hardening the organic insulating layers 3-1 to 3-5, the organic insulating layers 3-1 to 3-5 are shrunk. As a result, cracks C1, C2, C3 and C4 may be generated in the organic insulating layers 3-1, 3-2, 3-3 and 3-4, respectively, near the edges E2, E3, E4 and E5 of the organic insulating layers 3-2, 3-3, 3-4 and 3-5.

If residual metal remains in the cracks C1, C2, C3 and C4, the lead terminals 5 and 6 are short-circuited via the residual metal in the cracks C1, C2, C3 and C4 to the upper magnetic pole layer 7. That is, the winding layers 4-1 to 4-4 are short-circuited to the magnetic pole layer 7.

Figure 3:
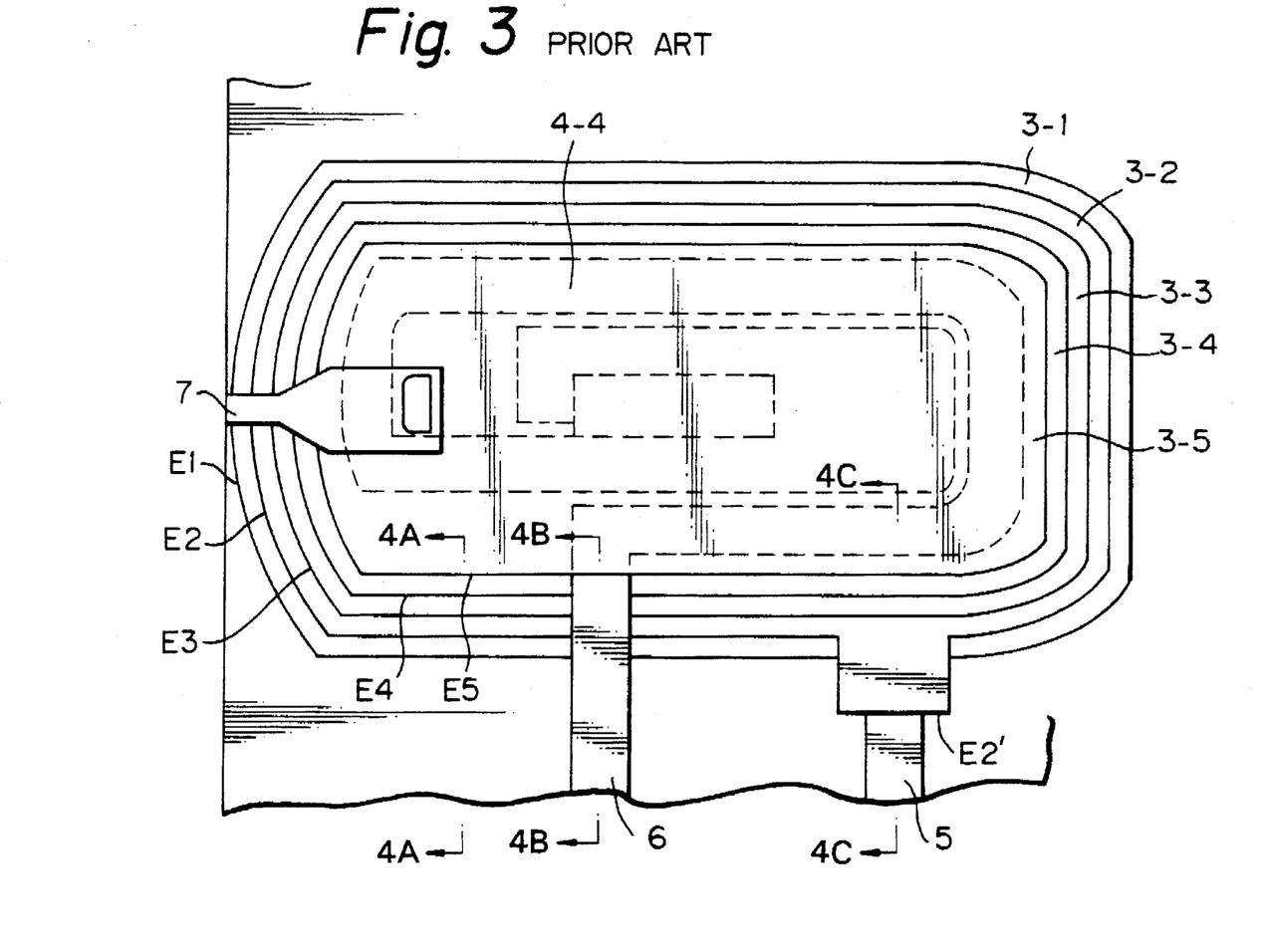
FIG. 3 is a plan view illustrating another prior art thin film magnetic head.
Figure 4A:
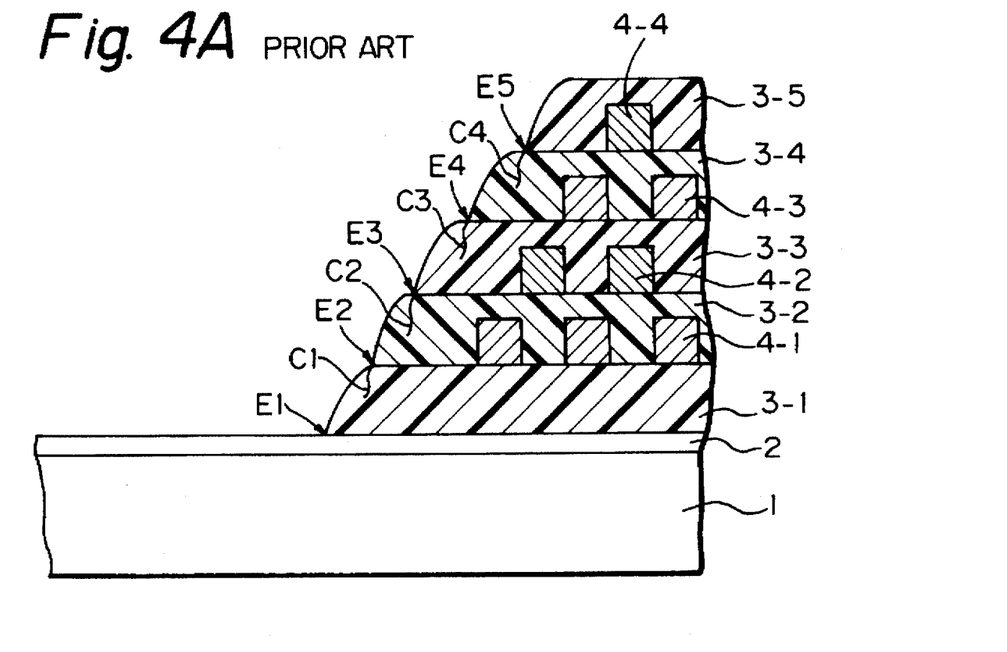
FIGS. 4A, 4B and 4C are cross-sectional views taken along the lines A—A, B—B and C—C, respectively, of FIG. 3.
Figure 4B:
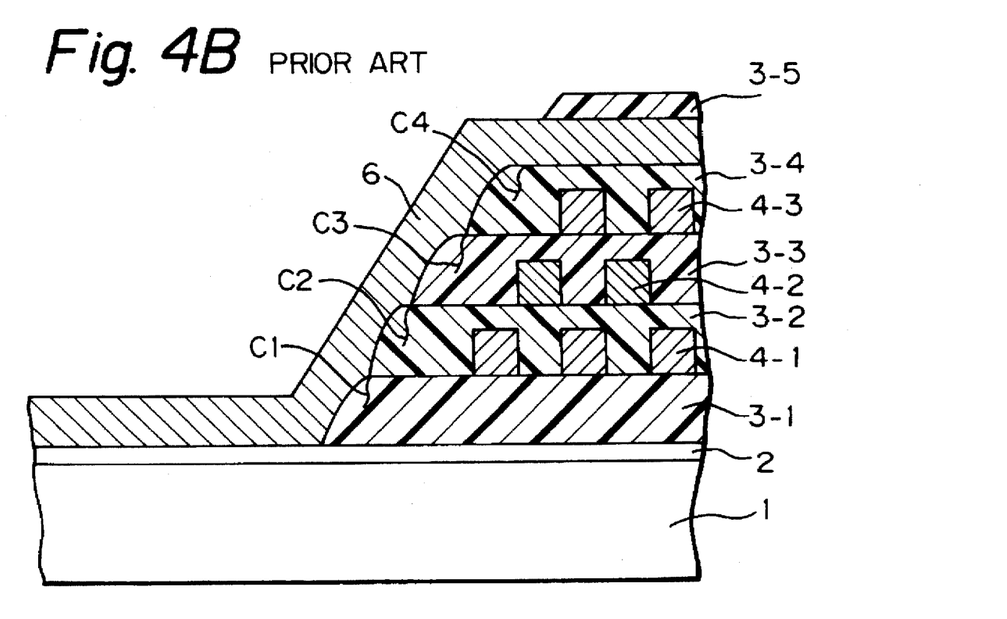
Figure 4C:
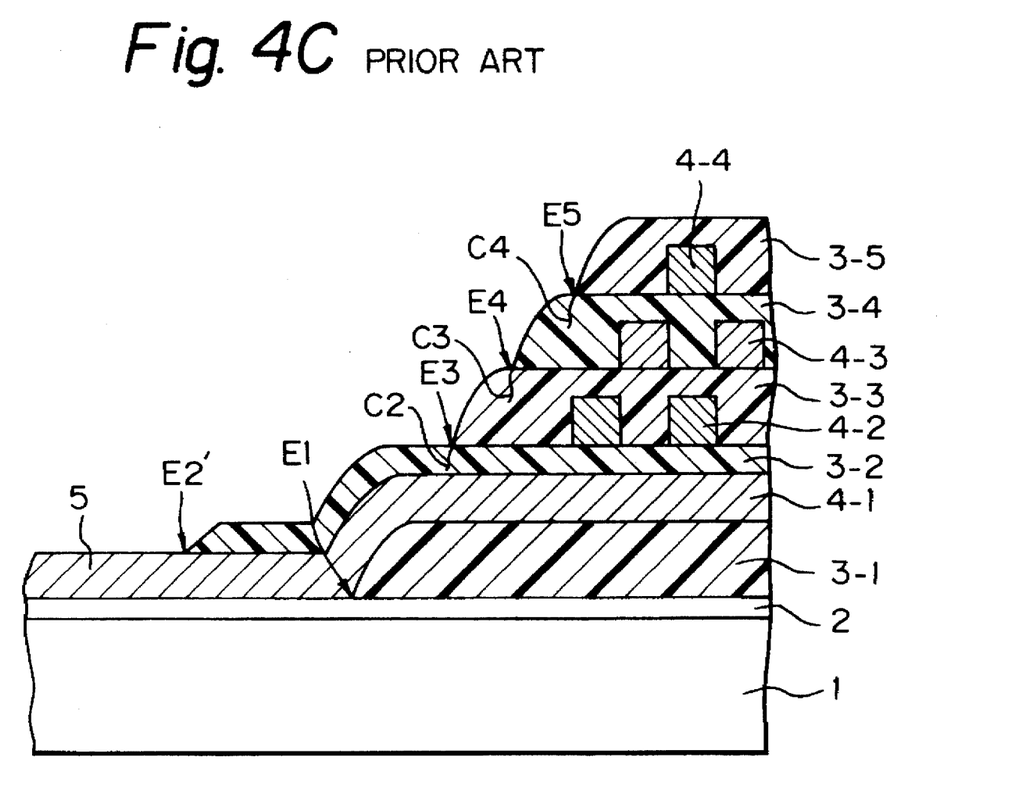

FIG. 3 is a plan view illustrating another prior art thin film magnetic head, and FIGS. 4A, 4B and 4C are cross-sectional views taken along the lines A—A, B—B and C—C, respectively, of FIG. 3 (see: JP-A-63-66710). In FIGS. 3, 4A, 4B and 4C, the organic insulating layer 3-2 is extended above the lower side lead terminal 5. That is, as shown in FIGS. 3 and 4C, the edge E2' of the organic insulating layer 3-2 on the lower side lead terminal 5 is outside of the edge E1 of the organic insulating layer 3-1 below the lower side lead terminal 5. As a result, even if the organic insulating layer 3-2 is shrunk by heat-curing, cracks are hardly generated in the organic insulating layer 3-1 beneath the lower side lead terminal 5. Therefore, a short-circuit between the lower side lead terminal 5 and the magnetic pole layer 7 can be avoided.

In FIGS. 3, 4A, 4B and 4C, however a short-circuit between the upper side lead terminal 6 and the magnetic pole layer 7 cannot be avoided.

Figure 5:
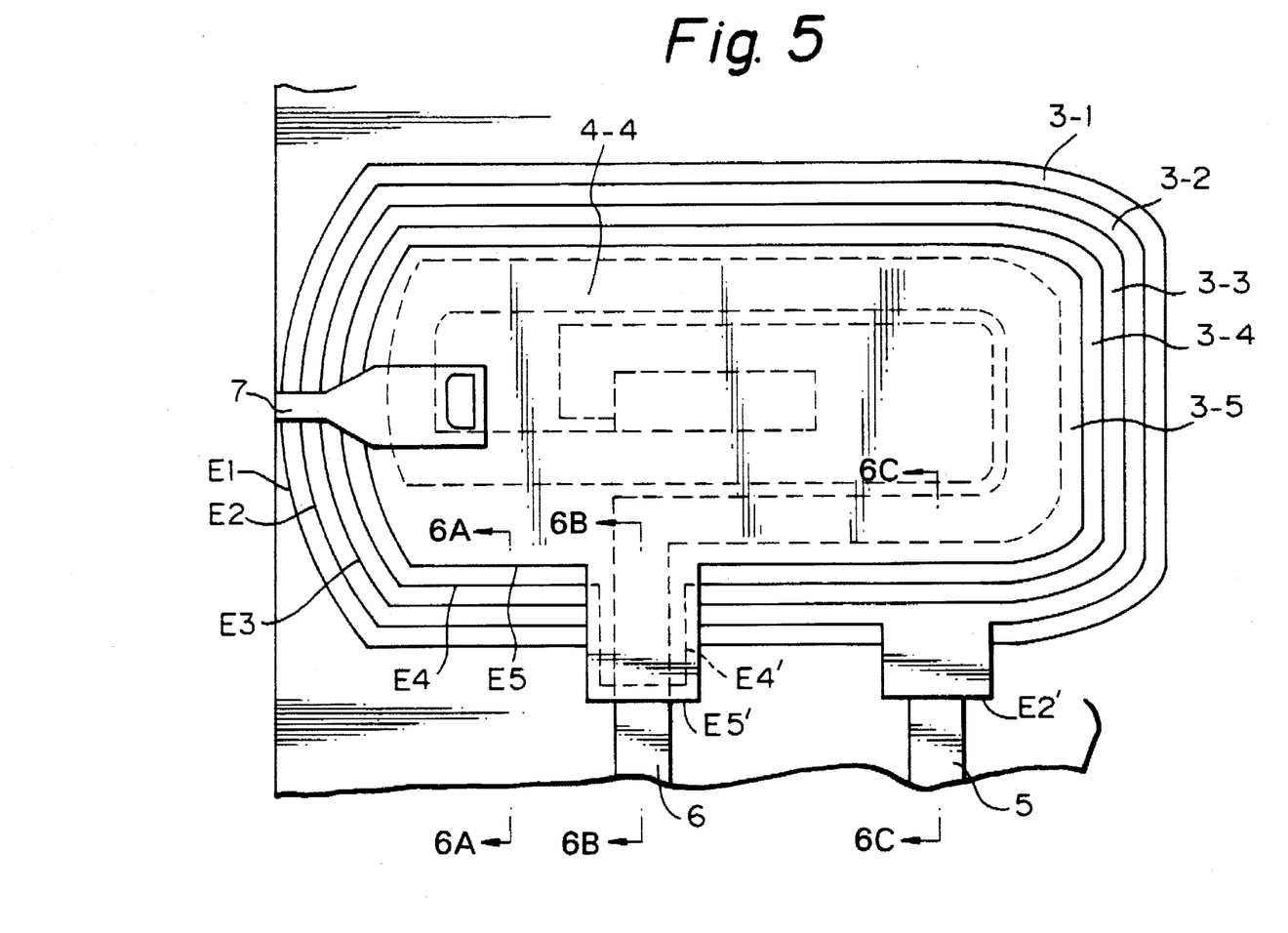
FIG. 5 is a plan view illustrating an embodiment of the thin film magnetic head according to the present invention.
Figure 6A:
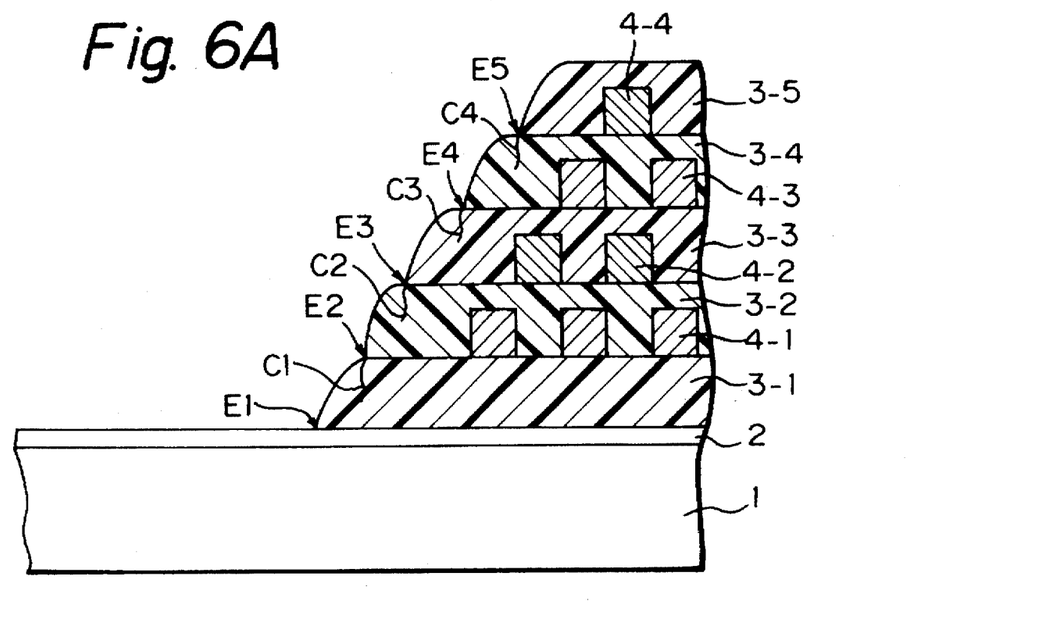
FIGS. 6A, 6B and 6C are cross-sectional views taken along the lines A—A, B—B and C—C, respectively, of FIG. 5.
Figure 6B:
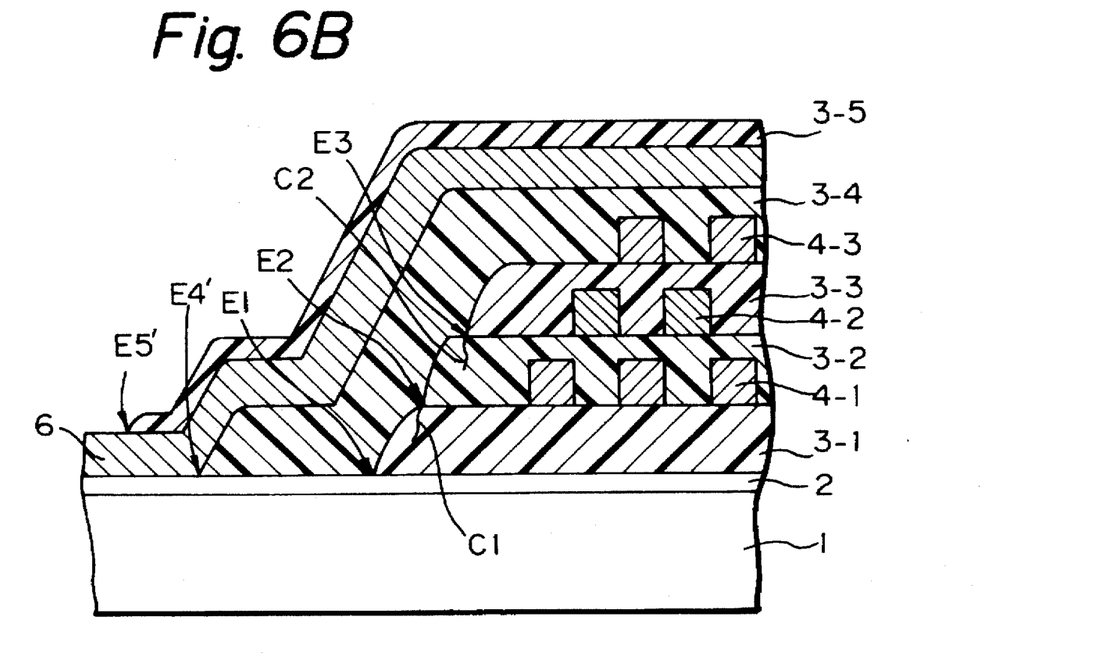
Figure 6C:
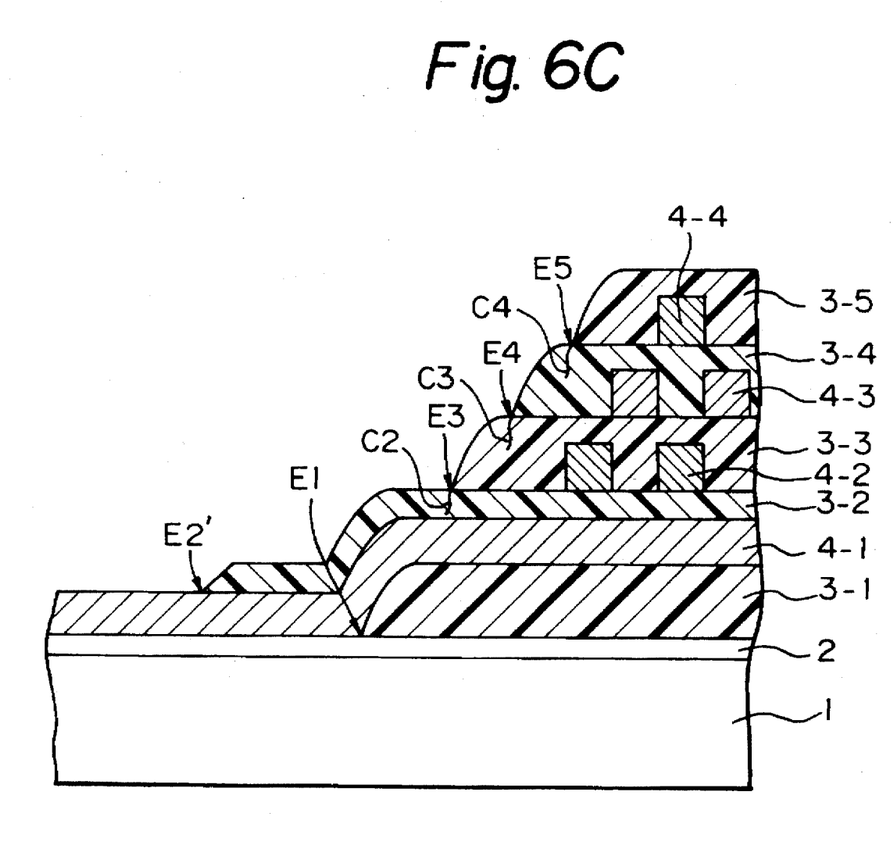

FIG. 5 is a plan view illustrating an embodiment of the present invention, and FIGS. 6A, 6B and 6C are cross-sectional views taken along the lines A—A, B—B and C—C, respectively, of FIG. 5. In FIGS. 5, 6A, 6B and 6C, the organic insulating layers 3-4 and 3-5 are extended to sandwich the upper side lead terminal 6. In this case, the organic insulating layer 3-4 covers the edges E1, E2 and E3 of the organic insulating layers 3-1, 3-2 and 3-3. As a result, even if the organic insulating layer 3-4 is shrunk by heat-curing, substantially no cracks are generated in the organic insulting layer 3-3 beneath the upper side lead terminal 6. Also, as shown in FIGS. 5 and 6B, the edge E5' of the organic insulating layer 3-5 on the upper side lead terminal 6 is outside of the edge E4' of the organic insulating layer 3-4 below the upper side lead terminal 6. As a result, even if the organic insulating layer 3-5 is shrunk by heat-curing, substantially no cracks are generated in the organic insulating layer 3-4 beneath the upper side lead terminal 6. Therefore, a short-circuit between the upper side lead terminal 6 and the magnetic pole layer 7 can be avoided.

Also, the extension of the organic insulating layer 3-5 on the upper side lead terminal 6 prevents the upper side lead terminal 6 from being in contact with contaminates.

As explained hereinbefore, according to the present invention, since the insulation of the upper side lead terminal is carried out without inviting cracks in the organic insulating layers sandwiching the upper side lead terminal, a short-circuit between the magnetic pole layers and the winding layers via the upper side lead terminal can be effectively avoided.

We claim:

1. A thin film magnetic head comprising:

a substrate;

a plurality of patterned organic insulating layers formed over said substrate;

a plurality of winding layers each being sandwiched by two of said organic insulating layers;

a lead terminal being formed by an extension of an uppermost one of said winding layers and being covered by one of said organic insulating layers immediately below said uppermost one of said winding layers and an uppermost one of said organic insulating layers, an edge of said uppermost one of said organic insulating layers on said lead terminal being outside of an edge of said one of said organic insulating layers under said lead terminal.

2. The thin film magnetic head as set forth in claim 1, wherein said one of said organic insulating layers covers edges of other organic insulating layers below said one of said organic insulating layers and said lead terminal.

3. A thin film magnetic head comprising:

a substrate;

N patterned organic insulating layers formed over said substrate, N being an integer greater than 2;

(N−1) winding layers, each of said winding layers being sandwiched by two of said organic insulating layers, an i-th winding layer of said winding layers being formed on an i-th organic insulating layer of said organic insulating layers, i being an integer greater than zero and less than N;

a lead terminal being formed by an extension of the (N−1)-th winding layer and being covered by the N-th and (N−1)-th organic insulating layers of said organic insulating layers; and an edge of the N-th organic insulating layer on said lead terminal being outside of an edge of the (N−1)-th organic insulating layer.

4. The thin film magnetic head as set forth in claim 3, wherein the (N−1)-th organic insulating layer covers edges of the (N−2)-th, (N−3)-th, - - - , and the first organic insulating layers of said organic insulating layers under said lead terminal.

* * * * *